(12) United States Patent
Barton

(10) Patent No.: US 10,579,642 B2
(45) Date of Patent: *Mar. 3, 2020

(54) TECHNIQUES FOR ADMINISTERING COMINGLED CONTENT ITEMS

(71) Applicant: Dropbox, Inc., San Francisco, CA (US)

(72) Inventor: Chris Barton, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,090

(22) Filed: May 14, 2018

(65) Prior Publication Data

US 2018/0260464 A1 Sep. 13, 2018

Related U.S. Application Data

(63) Continuation of application No. 15/242,176, filed on Aug. 19, 2016, now Pat. No. 9,971,824, which is a
(Continued)

(51) Int. Cl.
*G06F 16/27* (2019.01)
*G06F 16/22* (2019.01)
(Continued)

(52) U.S. Cl.
CPC .......... *G06F 16/27* (2019.01); *G06F 11/1451* (2013.01); *G06F 11/1464* (2013.01);
(Continued)

(58) Field of Classification Search
None
See application file for complete search history.

(56) References Cited

U.S. PATENT DOCUMENTS 7,363,330 B1 4/2008 Ellman et al.
8,311,985 B2 11/2012 O'Keefe et al.
(Continued)

OTHER PUBLICATIONS

U.S. Appl. No. 13/865,486, filed Apr. 18, 2013, Office Action, dated Aug. 14, 2013.
(Continued)

*Primary Examiner* — Amresh Singh
(74) *Attorney, Agent, or Firm* — Hickman Palermo Becker Bingham LLP

(57) ABSTRACT

Techniques for assisting owners to remotely administer their digital content items stored at non-owners' personal computing devices. The techniques involve identifying owned content items from among content items stored in a synchronization replica that is synchronized with synchronization replicas at the non-owners' personal computing devices. The techniques further involve allowing owners to remotely perform certain administrative actions on owned content items. For example, in response to a command initiated at an owner's personal computing device, a network signal or signals can be sent to a synchronization agent installed on the non-owners' personal computing devices to automatically remove all owned content items from the synchronization replicas at the non-owners' personal computing devices. For example, the generation and sending of such signal can be performed by an online content item storage and synchronization service that synchronizes a server-stored synchronization replica with the synchronization replicas at the non-owners' personal computing devices.

20 Claims, 3 Drawing Sheets

Related U.S. Application Data continuation of application No. 14/600,255, filed on Jan. 20, 2015, now Pat. No. 9,424,328, which is a continuation of application No. 13/865,486, filed on Apr. 18, 2013, now Pat. No. 9,020,915.

(51) Int. Cl.
  *G06F 16/178* (2019.01)
  *G06F 11/14* (2006.01)
  *G06F 21/60* (2013.01)

(52) U.S. Cl.
  CPC .......... *G06F 16/1787* (2019.01); *G06F 16/22* (2019.01); *G06F 21/604* (2013.01); *G06F 2201/80* (2013.01)

(56) References Cited

U.S. PATENT DOCUMENTS

| | | | |
|---|---|---|---|
| 2007/0294544 A1* | 12/2007 | Ishikawa | G06F 21/10 713/193 |
| 2009/0094247 A1 | 4/2009 | Fredlund et al. | |
| 2009/0177635 A1 | 7/2009 | Koohgoli | |
| 2011/0277013 A1 | 11/2011 | Chinta | |
| 2012/0036358 A1 | 2/2012 | Johnson et al. | |
| 2012/0284635 A1 | 11/2012 | Sitrick | |
| 2013/0013560 A1 | 1/2013 | Goildberg et al. | |
| 2015/0134610 A1 | 5/2015 | Barton et al. | |
| 2017/0046415 A1 | 2/2017 | Barton | |

OTHER PUBLICATIONS

Barton, U.S. Appl. No. 15/242,176, filed Aug. 19, 2016, Interview Summary, dated Jun. 26, 2017.
Barton, U.S. Appl. No. 15/242,176, filed Aug. 19, 2016, Notice of Allowance, dated Jan. 11, 2018.
Barton, U.S. Appl. No. 15/242,176, filed Aug. 19, 2016, Office Action, dated Mar. 22, 2017.
U.S. Appl. No. 13/865,486, filed Apr. 18, 2013, Advisory Action, dated Apr. 15, 2014.
U.S. Appl. No. 13/865,486, filed Apr. 18, 2013, Final Office Action, dated Feb. 11, 2014.
Barton, U.S. Appl. No. 15/242,176, filed Aug. 19, 2016, Final Office Action, dated Oct. 19, 2017.
U.S. Appl. No. 13/865,486, filed Apr. 18, 2013, Notice of Allowance, dated Jan. 7, 2015.
U.S. Appl. No. 14/600,255, filed Jan. 20, 2015, Office Action, dated Aug. 26, 2015.
U.S. Appl. No. 13/865,486, filed Apr. 18, 2013, Final Office Action, dated Oct. 20, 2014.
U.S. Appl. No. 13/865,486, filed Apr. 18, 2013, Office Action, dated Jun. 18, 2014.
U.S. Appl. No. 14/600,255, filed Jan. 20, 2015, Interview Summary, dated Nov. 16, 2015.
U.S. Appl. No. 14/600,255, filed Jan. 20, 2015, Interview Summary, dated Dec. 1, 2015.
U.S. Appl. No. 14/600,255, filed Jan. 20, 2015, Notice of Allowance, dated Apr. 22, 2016.
U.S. Appl. No. 13/865,486, filed Apr. 18, 2013, Interview Summary, dated Dec. 10, 2014.
Yecies, Laura Harvard Business Review, "Fire Syncing is Blending Your Work Life and Your Personal Life", HBR Blog Network, dated Dec. 4, 2012, 4 pages.

* cited by examiner

TECHNIQUES FOR ADMINISTERING COMINGLED CONTENT ITEMS

BENEFIT CLAIM

This application claims the benefit under 35 U.S.C. § 120 as a continuation of application Ser. No. 15/242,176, filed Aug. 19, 2016, which claims the benefit under 35 U.S.C. § 120 as a continuation of application Ser. No. 14/600,255, filed on Jan. 20, 2015, which claims benefit under 35 U.S.C. § 120 as a continuation of application Ser. No. 13/865,486, filed on Apr. 18, 2013. The entire contents of each of the above-mentioned applications is hereby incorporated by reference for all purposes as if fully set forth herein. The applicant(s) hereby rescind any disclaimer of claim scope in the parent applications or the prosecution history thereof and advise the USPTO that the claims in this application may be broader than any claim in the parent applications.

FIELD OF THE INVENTION

The present invention relates to digital content items and, more specifically, to techniques for remotely administering comingled digital content items.

BACKGROUND

The wide-availability of wired and wireless broadband Internet connections have made it feasible to operate network services on the Internet that were formerly only hosted on high-speed local data networks (e.g., Local Area Networks). Today, network services exist that store user's digital content on server computing devices connected to the Internet and provide an interface whereby users can manage their server-stored digital content items from their personal computing devices. Such digital content items include, but are not limited to, digital documents, digital music, digital video, digital images, e-mail messages, database records, or other logical collections of digital data.

At the same time, personal computing has become more global and more mobile. The widespread adoption of portable personal computing devices such as laptops, Personal Data Assistants (PDAs), tablet computers, music players, and cell phones allow users to access to their personal server-stored digital content items virtually anywhere. A user flying on a plane to New York can access e-mail stored on a server in San Francisco. Friends in disparate geographic locations can instantly share digital photos with each other.

Unfortunately, many portable personal computing devices, especially portable wireless devices, operate in semi-connected computing environments. In semi-connected computing environments, network connectivity from the portable personal computing devices to an Internet network service may be intermittent, low-bandwidth, or high-latency. As a result, to increase availability to users' personal digital content in semi-connected environments, some Internet network services replicate server-stored digital content to the users' personal computing devices for storage at the personal computing devices thereby creating copies of the users' digital content at the personal computing devices. By doing so, users have access to their digital content items even when network connectivity is unavailable. Even when network connectivity is available, users may still prefer to access their digital content items locally as opposed to over a network for efficiency.

Creating copies of digital content at users' personal computing devices can be problematic when some but not all of the digital content belongs to the user. For example, an employee may use an Internet service paid for by his employer to store documents containing sensitive corporate information such as client presentations, spreadsheets containing company financial information, corporate legal documents, sales contracts, etc. If the employee leaves the company or is fired, the company would prefer that all corporate-owned digital content items are deleted from the former-employee's personal computing devices.

Various techniques have been developed to help digital content owners retain control over digital content stored at non-owner's personal computing devices. For example, some Internet services provide the ability to remotely "wipe" a personal computing device connected to the service. Specifically, the service sends a signal to the personal computing device to delete all locally-stored digital content items associated with the service.

However, some digital content items stored at the user's personal computing device may be owned by the user and some may be owned by another user or entity (e.g., a corporation). For example, an employee may comingle his own digital content items (e.g., personal photos, shopping lists, personal e-mails, etc.) with corporate documents. Therefore, it is desirable to provide techniques for remotely administering digital content items stored at personal computing devices in situations where some of the content items stored at the devices are owned by the users of the devices and some are owned by other users or entities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
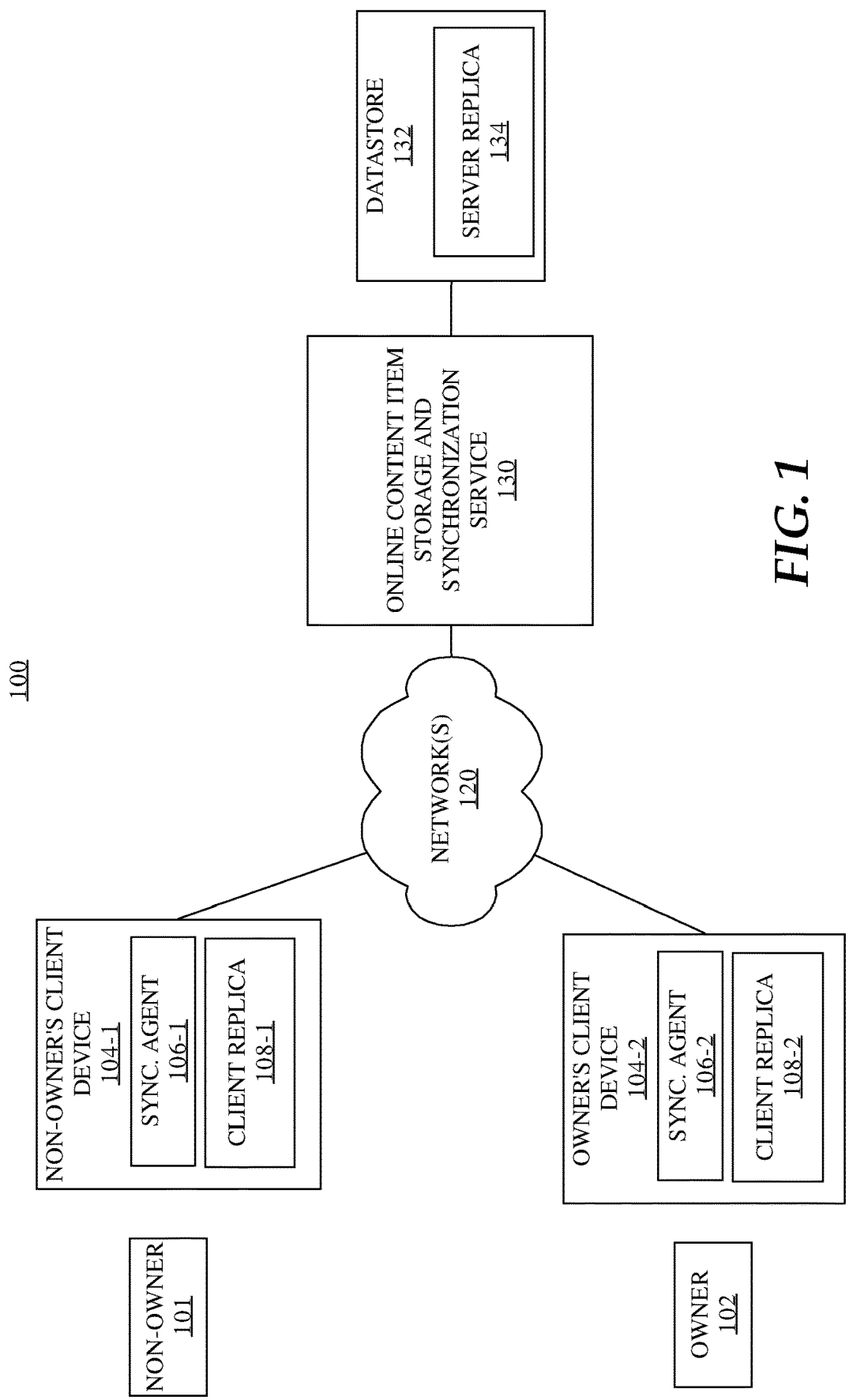
FIG. 1 is a block diagram illustrating a content item storage and synchronization system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for assisting owners to remotely administer their digital content items stored at non-owners' personal computing devices. The techniques involve identifying owned content items from among content items stored in a synchronization replica that is synchronized with synchronization replicas at the non-owners' personal computing devices. The synchronization replica that is used to identify "owned" content items is referred to herein as a "source" synchronization replica and can be, for example, a synchronization replica at an owner's personal computing device or a server-stored synchronization replica.

The techniques further involve allowing owners to remotely perform certain administrative actions on owned content items stored at the non-owners' personal computing devices. For example, in response to a command initiated at an owner's personal computing device, a network signal or signals can be sent to a synchronization agent installed on the non-owners' personal computing devices to automatically delete all owned content items from the synchronization replicas at the non-owners' personal computing devices. In one embodiment, the generation and sending of such signal can be performed by an online content item storage and synchronization service that synchronizes a server-stored synchronization replica with the synchronization replicas at the non-owners' personal computing devices.

Content Item Storage and Synchronization System

Though not essential to every embodiment of the present invention, some embodiments make use of the following concepts and principles: 1. It is not practical or it is inconvenient to require non-owners to segregate on their personal computing devices their personal content items from owned content items. 2. Non-owners will comingle on their personal computing devices their personal content items with owned content items. 3. The creator of a content item is not necessarily the owner of the content item. For example, an accounting employee creating an invoice for her employer may not be the owner of the invoice. 4. Because of the potential number of comingled content items, it is inefficient or impractical to manually classify all comingled content items by ownership. Therefore, software systems, including content item storage and synchronization systems that replicate content items between computing devices, should not require owners to manually classify all comingled content items stored at a personal computing device of a non-owner by ownership before the owned content items can be deleted from the personal computing device of the non-owner.

In some embodiments, the content item storage and synchronization system and method herein operate under the following rules and definitions: 1. Any content item synchronized by the system classified as one owned by an owner of the content item is considered to be an "owned content item". 2. Owners can delete content items they own from the personal computing devices of non-owners at which the owned content items are stored. 3. In an effort to provide recourse to non-owners who believe an owned content item was wrongly deleted from their personal computing device, the system can provide a facility whereby the non-owners can request that deleted owned content items be restored to their personal computing devices upon approval by the owner.

For example, the preceding rules and definitions may be appropriate for certain relationships between the owner and the non-owner. Specifically, for relationships where the owner has administrative control over the content items synchronized by the system to the non-owner's personal computing devices. Examples of such a relationship include, but are not limited to, parent (owner)—child (non-owner), employer (owner)—employee (non-owner), teacher (owner)—student (non-owner), etc. In these types of relationships, the owner has an interest in retaining control over owned content items stored at the non-owner's personal computing devices. At the same time, non-owners have an interest in retaining control over their personal content items stored at their devices. Embodiments of the present invention provides the ability for the owner to remotely administer comingled content items stored at non-owners' personal computing devices in a way that serves the interests of both owners and non-owners in retaining control over their respectively owned content items.

In some embodiments, the techniques for remotely administering comingled content items operate in a content item storage and synchronization system as depicted in FIG. 1. System 100 includes client personal computing devices 104 connected to online content item storage and synchronization service 130 by one or more data networks 120.

Client devices 104 can include, but are not limited to, stationary and portable computing devices. Stationary computing devices include, for example, desktop computers and workstation computers. Portable computing devices include, for example, laptops, Personal Data Assistants (PDAs), tablet computers, music players, and cell phones.

Data networks 120 can include any of a wired network (e.g., an IEEE 802.3 network), a wireless network (e.g., an IEEE 802.11 network), a cellular network (e.g., a GSM network), a Local Area network, a Wide Area Network (e.g., the Internet), etc. Typically, network communication between client devices 104 and service 130 occurs over data networks 120 according to one or more networking protocols. Such networking protocols can include, for example, Internet suite protocols (e.g., HTTP/HTTPS, TCP, IP, etc.). Client devices 104-1 and 104-2 can be connected to service 130 over different sets of data networks 120. For example, client device 104-1 can be connected to service 130 over set of data networks 120 that includes a cellular network while client device 104-2 can be connected to service 130 over set of data networks 120 that includes a wireless network. Client devices 104-1 and 104-2 can also be connected to each other over set of data networks 120 that are different than set of data networks 120 by which either client device 104-1 or client device 104-2 is connected to service 130.

Service 130 is operatively coupled to datastore 132 for storing service-related data. Service 130 and datastore 132 can be implemented by one or more server computing devices (not shown). For example, service 130 and datastore 132 may be hosted in a data center or other computer hosting facility providing network connectivity to the Internet or other data network.

Each of client device 104-1, client device 104-2, and service 130 may store a replica of the "same" set of comingled content items. In particular, client device 104-1 stores client replica 108-1, client device 104-2 stores client replica 108-2, and service 130 stores server replica 134. Logically, client replicas 108 and server replica 134 can each store the "same" set of content items. However, client replicas 108 and server replica 134 may store the set of content items in different forms. For example, client replicas 108 may correspond to a portion of a file system provided by an operating system that client devices 104 are configured with. Server replica 134, on the other hand, may correspond to a portion of a distributed datastore, for example. As used herein, the term "content item" refers to any logical collection of digital data. Non-limiting examples of content items include, but are not limited to, text documents, markup-language documents, digital documents, digital music, digital video, digital images, e-mail messages, database records, or any other logical collections of digital data.

With respect to the set of comingled content items, synchronization agent 106-1 installed on client device 104-1 may be configured to asynchronously propagate to service 130 changes made to replica 108-1. Similarly, synchronization agent 106-2 on client device 104-2 may be configured to asynchronously propagate to server 130 changes made to replica 108-2. Service 130 may be configured to asynchronously propagate to synchronization agents 106-1 and 106-2 changes made to server replica 134. Changes to replicas 108-1, 108-2, and 134 that can be asynchronously propagated can include adding a content item to a replica, removing (deleting) a content item from a replica, editing (changing) a content item in a replica, and modifying metadata (e.g., content item ownership information) associated with a content item in a replica.

As system 100 may employ an asynchronous change propagation scheme, the set of comingled content items and associated metadata stored in each replica 108-1, 108-2, and 134 are loosely consistent with one another. That is, data (e.g., the set of content items) in each replica 108-1, 108-2, and 134 may diverge from time to time such that any given moment one replica's view of the set of content items may be different from another replica's data view of the set of content items. In the absence of new changes, the replicas 108-1, 108-2, and 134 may be expected to eventually become consistent with one another.

Identifying Owned Content Items

As mentioned above, a "source synchronization replica" can be used to identify owned content items stored in a non-owner's replica. For example, client replica 108-2 or server replica 134 can be used to identify content items owned by owner 102 stored in non-owner's replica 108-1. In some embodiments, identification of owned content items is performed by owner 102. In some embodiments, identification of owned content items is performed automatically by synchronization agent 106-2 (or other software installed on device 104-2) and/or service 130 based on "ownership identification criteria" provided by owner 102.

In some embodiments, synchronization agent 106-2 or other software installed on device 104-2 provides a user interface to owner 102 whereby owner 102 can browse for content items in client replica 108-2 that may be owned content items. For example, the user interface may present a file system browser for browsing content items stored in client replica 108-2. The file system browser may present the content items in a file-folder hierarchy whereby owner 102 can locate owned content items by the content item name (e.g., a filename or folder name). In some embodiments, owner 102 can interact with a content item presented or listed in the file system browser to designate it as an owned content item. For example, owner 102 may right-click on a content item presented in the file system browser using a pointing device (e.g., a mouse) and then select an option from a pop-up menu to designate the selected content item as owned by owner 102. As a result, metadata associated with the content item indicating that the content item is owned by owner 102 is stored in replica 108-2. This metadata can then be asynchronously propagated to service 130 by synchronization agent 106-2 where it is stored in server replica 134 in association with the server replica's 134 copy of the content item. In turn, service 130 can asynchronously propagate the metadata to synchronization agent 106-1 at non-owner's device 104-1 where it is stored in client replica 108-1 in association with client replica's 108-1 copy of the content item.

In some embodiments, synchronization agent 106-2 or other software installed on device 104-2 provides a user interface to owner 102 whereby owner 102 can search for content items in client replica 108-2 that may be owned content items. To facilitate fast searches, content items stored in client replica 108-2 may be indexed by relevant keywords. The search user interface can accept a set of one or more keywords input by owner 102. The input keywords are then used to consult the index to identify content items stored in replica 108-2 relevant to the input keywords. The user interface can present a list of the relevant content items to owner 102. That user interface can also allow owner 102 to select one or more of the listed relevant content items as owned content items.

Similarly, in some embodiments, service 130 provides a web-based user interface whereby owner 102 can browse or search for content items in server replica 134 that may be owned content items. Owner 102 can access the user interface from device 104-2, for example, using conventional web browsing software installed on device 104 or another software application installed on device 104-2. The web-based user interface can allow owner 102 to select and designate content items in sever replica 134 as owned content items.

As mentioned above, owner 102 can provide "ownership identification criteria" for use by synchronization agent 106-2 or other software installed on device 104-2 to automatically identify owned content items in client replica 108-2. Ownership identification criteria refers to any criteria that may be used to automatically identify an owned content item. Thus, ownership identification criteria may include, for example, a set of keywords, or pattern matching expression that is compared against content item content to identify owned content items. In some embodiments, a content item identified as satisfying ownership identification criteria is automatically designated as an owned content item. In such embodiments, automatic designation can include associating metadata in a replica with the replica's copy of the content item that indicates that the content item is an owned content item.

Ownership identification criteria may also be based on things other than content item content. For example, in one embodiments, ownership identification criteria specifies a set of client devices and if a content item is accessed (e.g., opened, read, edited, copied) by a user at one of the specified devices, then the content item is considered to be an owned content item. For example, the specified set of client devices may be under the administration of the owner. For example, the specified set of client devices may belong to an employer.

In some embodiments, ownership identification criteria is based on the time of day. For example, content items access or modified between the hours of 9 am and 5 pm may be identified as owned content items.

In some embodiments, ownership identification criteria is based on the type of the content item. For example, content items associated with specified document types (e.g., PDF, MSWORD, MSEXCEL, etc.) may be identified as owned content items.

Similarly, as mentioned above, owner 102 can also provide ownership identification criteria for use by service 130 to similarly automatically identify and designate owned content items in server replica 134.

While in some embodiments ownership identification criteria is provided by owner 102, in other embodiment ownership identification criteria is predefined or automatically determined based on computer-training algorithms configured to generate ownership identification criteria based on a provided training set of content items.

In some embodiments, ownership identification criteria is used by service 130 to identify owned content items during asynchronous propagation of changes between replicas. For example, for a change to replica 108-1 or 108-2 that results in the change being communicated to service 130, service 130 can apply ownership identification criteria to the communicated change to determine whether any changed content items are owned content items. For example, if non-owner 101 adds a new word processing document to replica 108-1 containing keywords specified in ownership identification criteria, then that document can be identified by service 130 as an owned content item when receiving the change propagated to it by synchronization agent 106-1.

While is some embodiments described above ownership identification criteria is used at certain times to identify owned content items, it should be understood that the embodiments are not limited to using the ownership identification criteria at only those times or only at certain times. Instead, synchronization agent 106-2 or other software installed on device 104-2 can use ownership identification criteria at any convenient or efficient time to automatically identify and designate content items in replica 108-2 as owned content items. Similarly, service 130 can use ownership identification criteria at any convenient or efficient time to automatically identify and designate content items in server replica 134 as owned content items.

In some embodiments, synchronization agent 106-2 or other software installed on device 104-2 provides a user interface whereby owner 102 can specify ownership identification criteria for automatically identifying and designating content items in replica 108-2 as owned content items. In some embodiments, service 130 provides a web interface whereby owner 102 can specify ownership identification criteria for automatically identifying and designating content items in server replica 134 as owned content items.

Ownership Indicators

As mentioned above, when a content item in the source synchronization replica is designated as an owned content either manually by the owner or automatically according ownership identification criteria, metadata may be stored in the source synchronization replica in association with the content item that indicates that the content is an owned content item. This ownership metadata may also be asynchronously propagated to other synchronization replicas. For example, ownership metadata stored in replica 108-2 can be asynchronously propagated to service 130 for storage in replica 134. Similarly, ownership metadata stored in replica 134 can be asynchronously propagated to synchronization agent 106-1 for storage in replica 108-1.

Ownership metadata for a content item can include a variety of ownership information about the content item. For example, ownership metadata can indicate whether the ownership of the content item has been claimed, who claimed ownership, when ownership was claimed, etc. In some embodiments, ownership metadata associated with a content item is used to indicate to ownership information. For example, an owned content item may be indicated with a special icon or other visual indicator when presented in a file-folder browser or on a web page.

Remote Administration of Owned Content Items

As mentioned above, owned content items stored in a non-owner's synchronization replica can be remotely administered by the owner of the content items. For example, owner 102 can remotely administer from device 104-2 owned content items stored in replica 108-1. In some embodiments, owner 102 command service 130 to perform one or more administrative actions on owned content items stored in replica 108-1. Such commands can be provided by owner 102, for example, through a web-based interface offered by service 130. For example, owner 102 can use web browser software or a dedicated software application installed on device 104-2 to access the web-based interface.

A variety of different administrative actions may be remotely performed by the owner on owned content items.

In some embodiments, owner 102 commands server 130 to delete owned content items stored in non-owner's replica 108-1. To delete the owned content items, service 130 signals synchronization agent 106-1 to delete the owned content items stored in replica 108-1.

In some embodiments, if non-owner 101 uses multiple devices 104 each with a synchronization replica 108 and a synchronization agent 106-1, owner 102 can select through the web-based interface which of the multiple devices 104 used by non-owner 101 to delete owned content items from. For example, owner 102 may select only those devices 104 that do not belong to the owner 102 or the owner's 102 employer.

In some embodiments, in addition to or instead of deleting owned content items stored in client replica 108-1 in response to receiving the signal to do so from service 130, synchronization agent 106-1 scans device 104-1 for owned content items stored at the device 104-1 but outside replica 108-1 and deletes owned content items it finds as a result of the scan. For example, synchronization agent 106-1 can scan the entire file system of device 104-1 for owned content items.

Identifying owned content items at device 104-1 outside replica 108-1 during the scan can be based on a variety of different factors. For example, the ownership identification criteria discussed above can be used by synchronization agent 106-1 to identify owned content items at device 104-1 outside replica 108-1.

In one approach, synchronization agent 106-1 uses cryptographic hashes of owned content items stored in replica 108-1. Specifically, synchronization agent 106-1 computes cryptographic hashes for content items at device 104-1 outside replica 108-1 and compares then to the known cryptographic hashes for owned content items in replica 108-1, if an outside content item is found with a cryptographic hash that matches one of the known cryptographic hashes, then the outside content item is considered to be an owned content item and deleted. Other available content item information such as size and last modified data/time can also be similarly used to identify owned content items or to confirm with greater confidence that an outside content item with a matching cryptographic hash is an owned content item.

In another approach, owned content items stored in replica 108-1 are modified to include a unique digital watermark or other unique digital fingerprint. For example, server 130 or synchronization agents 106 can add the digital watermark when a content item is stored in a replica 108-1, 108-2, or 134 or a content stored in a replica 108-1, 108-2, or 134 is identified as an owned content item. In this way, if a watermarked content item stored in replica 108-1 is copied or moved outside replica 108-1 at device 104-1, synchronization agent 106-1 can identify the copied or moved content item during the scan by looking for content items containing the digital watermark.

Disputing Ownership

In some embodiments, service 130 provides a facility whereby non-owner 101 can dispute a claim of ownership to content items. In particular, service 130 provides a web-based interface whereby non-owner 101 can submit a claim of ownership to an owned content item. For example, non-owner 101 can submit the claim after identifying one or more content items stored in replica 108-1 having an ownership indicator that indicates that owner 102 has claimed ownership of the content item. As another example, non-owner 101 can submit the claim after content items have been deleted from device 104-1.

The claim by non-owner 101 can specify individual content items or individual groups of content items that the non-owner 101 believes he or she rightfully owns. Alternatively, if owned content items have been deleted from device 104-1, the claim by non-owner 101 can dispute generally the deletion of the content items.

In some embodiments, a claim of ownership to a content item submitted by non-owner 101 to service 130 is routed to owner 102 for approval or disapproval of the claim. For example, service 130 may send the claim to owner 102 in an e-mail message or present the non-owner's claim on a web page presented at owner's client device 104-2. If by e-mail, the e-mail message may include a hyperlink back to service 130 which accesses the web page presenting non-owner's 101 claim. The web page presenting non-owner's 101 claim can present graphical user interface controls for approving or disapproving the claim by non-owner 101. If approved and the claim to ownership involves content items deleted from device 104-1, service 130 can modify server replica 134 so that the deleted content items are restored to device 104-1 as part of the synchronization process. If approved and the claim to ownership involves content items associated with ownership metadata indicating ownership by owner 102, then the ownership metadata associated with the involved content items in server replica 134 can be modified or removed so that ownership by owner 102 is no longer indicated.

Example Process

Figure 2:
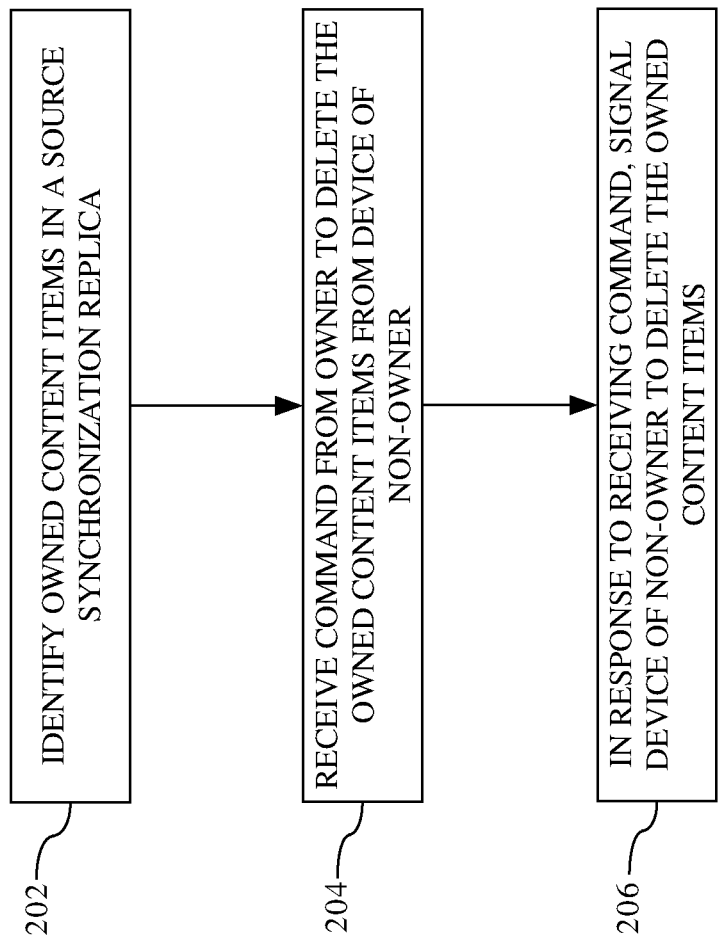
FIG. 2 is a flow diagram illustrating a process for assisting owners to remotely manage owned content items stored at a personal computing device of a non-owner.

Referring to FIG. 2, it is a flowchart 200 that depicts steps performed to assist an owner in remote administration of owned content items stored at a non-owner's personal computing device, according to one embodiment. The steps may be performed by one or more computing devices. For example, the steps may be performed by one or more service computing devices that implement service 130 and/or owner's client device 104-2.

At step 202, one or more owned content items are identified in a source synchronization replica. The source synchronization replica can be client replica 108-2 and/or server replica 134, for example. Identification can be made by owner 101 and/or automatically by synchronization agent 106-2 (or other software installed on device 104-2) and/or service 130.

At step 204, in one embodiment, a command is received to delete the owned content items identified during step 202 from non-owner's device 104-1. For example, the command may be initiated by owner 102 at device 104-2. For example, owner 102 may use web browsing software or other software installed on device 104-2 to command service 130 to delete the owned content items. At step 206, in response to receiving the command to delete the owned content items from non-owner's device 104-1, service 130 signals synchronization agent 106-1 at device 104-1 to delete the owned content items identified during step 202 from replica 108-1.

In another embodiment, at step 204, synchronization agent 106-2 or other software installed on device 104-2 receives a command to delete the owned content items identified during step 202 from non-owner's device 104-1. At step 206, in response to receiving the command, synchronization agent 106-2 or the other software directly signals synchronization agent 106-1 at device 104-1 to delete the owned content items identified during step 202 from replica 108-1, bypassing service 130.

Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
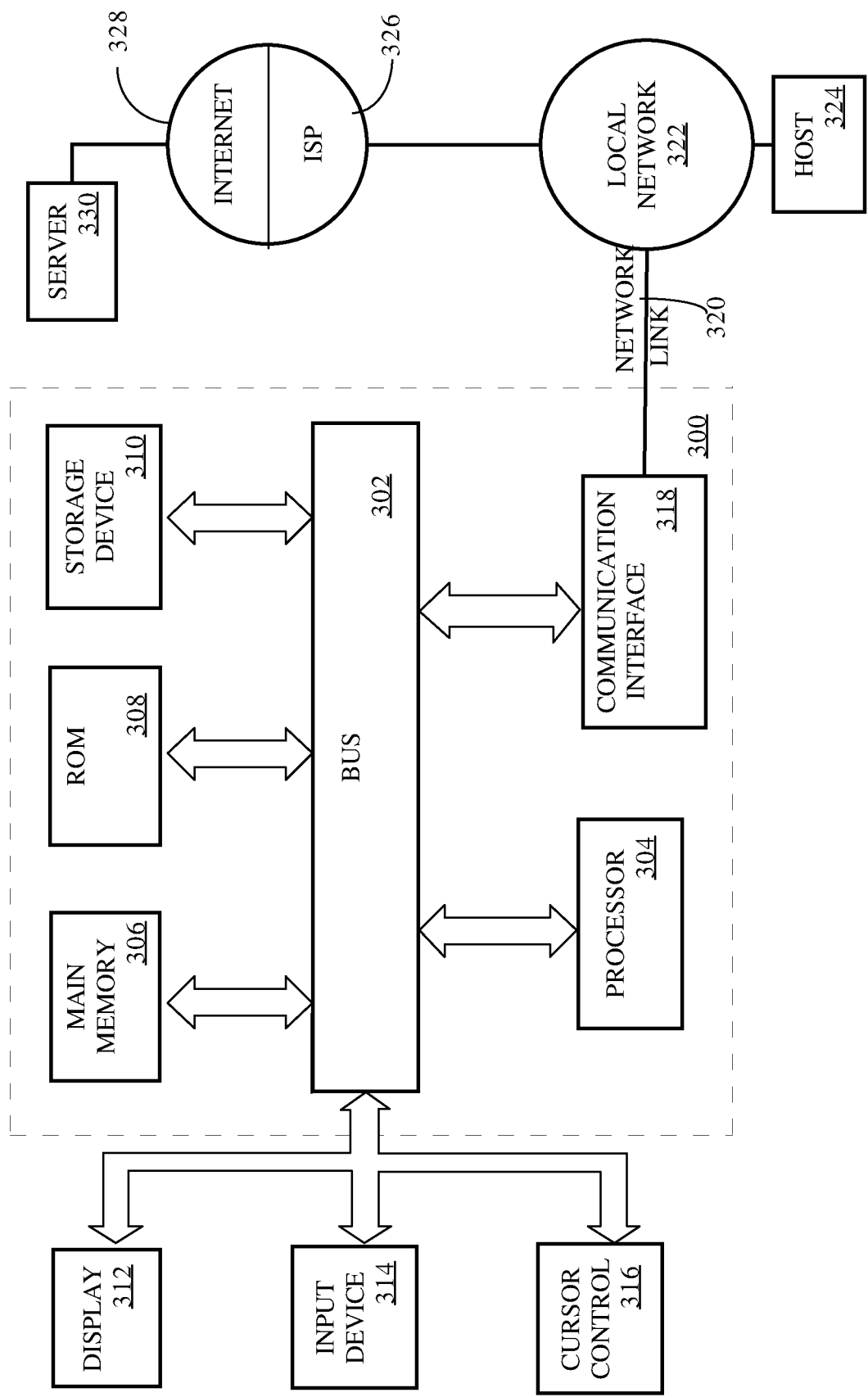
FIG. 3 is a block diagram of a computer system upon which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
receiving an indication to perform one or more commands in relation to one or more first content items, stored on a computing device, that, according to metadata stored at the computing device, are identified as owned by an entity;
the computing device storing one or more second content items at a different location on the computing device than a location at which the computing device stores the one or more first content items;
generating identifying information from the one or more first content items, stored on the computing device, that are identified as owned by the entity;
generating identifying information from the one or more second content items that are stored at the different location on the computing device than the location at which the computing device stores the one or more first content items;
comparing the identifying information generated from the one or more second content items with the identifying information generated from the one or more first content items;
based on the comparing the identifying information generated from the one or more second content items with the identifying information generated from the one or more first content items, creating and storing metadata at the computing device that identifies at least one content item, in the one or more second content items stored at the different location, as being owned by the entity;
wherein the metadata created and stored that identifies the at least one content item as being owned by the entity is distinct from the identifying information generated from the one or more first content items and the identifying information generated from the one or more second content items;
in response to the indication to perform the one or more commands in relation to the one or more first content items, performing the one or more commands on at least the one or more first content items, and based on the metadata created and stored that identifies the at least one content item as being owned by the entity, performing the one or more commands on the at least one content item, in the one or more second content items stored at the different location, identified as owned by the entity; and wherein the method is performed by one or more computing devices.

2. The method of claim 1, wherein:

the location, at which the computing device stores the one or more first content items, is within one or more locations at which synchronization replica is stored at the computing device and the different location is a location outside of the one or more locations at which the synchronization replica is stored at the computing device;

data from the synchronization replica on the computing device is synchronized by a synchronization process with data from a remote synchronization replica on a remote computing device.

3. The method of claim 1, further comprising:

generating additional identifying information from the at least one content item that has been identified in the one or more second content items as being owned by the entity;

comparing the additional identifying information generated from the at least one content item with additional identifying information generated from a corresponding content item of the one or more first content items;

based on the comparing the additional identifying information generated from the at least one content item with the additional identifying information generated from the corresponding content item of the one or more first content items, confirming the at least one content item in the one or more second content items as being owned by the entity.

4. The method of claim 1, wherein the identifying information generated from the one or more first content items comprises at least one of: a cryptographic hash, a digital fingerprint, a size, and a last modified datetime of a content item.

5. The method of claim 4, wherein the digital fingerprint is a digital watermark.

6. The method of claim 1, wherein the identifying information generated from the one or more first content items comprises corresponding one or more first digital watermarks, and the method further comprises:

generating identifying information from the one or more second content items by scanning the one or more second content items and extracting corresponding one or more second digital watermarks from the one or more second content items;

comparing the identifying information generated from the one or more second content items with identifying information generated from the one or more first content items by comparing the corresponding one or more second digital watermarks with the corresponding one or more first digital watermarks.

7. The method of claim 1, wherein generating identifying information generated from the one or more second content items comprises computing respective one or more second cryptographic hashes using data from the one or more second content items.

8. The method of claim 7, further comprising:

computing respective one or more first cryptographic hashes using data from the one or more first content items thereby generating the identifying information from the one or more first content items;

comparing the identifying information generated from the one or more second content items with identifying information generated from the one or more first content items by comparing the respective one or more second cryptographic hashes with the respective one or more first cryptographic hashes.

9. The method of claim 1, further comprising:

prior to receiving the indication to perform the one or more commands, applying ownership identification criteria to a plurality of content items that are stored at the location of the computing device at which the computing device stores the one or more first content items;

based, at least in part, on the applying the ownership identification criteria to the plurality of content items stored, automatically identifying one or more first content items of the plurality of content items as owned by the entity.

10. The method of claim 1, wherein the location, at which the computing device stores the one or more first content items, is within one or more locations at which synchronization replica is stored at the computing device, and the method further comprises:

prior to receiving the indication to perform the one or more commands, receiving results of applying ownership identification criteria to a plurality of content items that are stored in a remote synchronization replica on a remote computing device wherein the receiving is caused by a synchronization process in which metadata of the plurality of content items, which indicate ownership by the entity, is replicated from the remote synchronization replica to the synchronization replica of the computing device.

11. A computing system comprising:

one or more processors;

one or more programs configured for execution by the one or more processors, the one or more programs comprising instructions configured for:

receiving an indication to perform one or more commands in relation to one or more first content items, stored on the computing system, that, according to metadata stored at the computing system, are identified as owned by an entity;

storing one or more second content items at a different location on the computing system than a location at which the computing system stores the one or more first content items;

generating identifying information from the one or more first content items, stored on the computing system, that are identified as owned by the entity;

generating identifying information from the one or more second content items that are stored at the different location on the computing system than the location at which the computing system stores the one or more first content items;

comparing the identifying information generated from the one or more second content items with the identifying information generated from the one or more first content items;

based on the comparing the identifying information generated from the one or more second content items with the identifying information generated from the one or more first content items, creating and storing metadata at the computing system that identifies at least one content item, in the one or more second content items stored at the different location, as being owned by the entity;

wherein the metadata created and stored that identifies the at least one content item as being owned by the entity is distinct from the identifying information generated from the one or more first content items and the identifying information generated from the one or more second content items; and in response to the indication to perform the one or more commands in relation to the one or more first content items, performing the one or more commands on at least the one or more first content items, and based on the metadata created and stored that identifies the at least one content item as being owned by the entity, performing the one or more commands on the at least one content item, in the one or more second content items stored at the different location, identified as owned by the entity.

12. The computing system of claim 11, wherein:
the location, at which the computing system stores the one or more first content items, is within one or more locations at which synchronization replica is stored at the computing system and the different location is a location outside of the one or more locations at which the synchronization replica is stored at the computing system;
data from the synchronization replica on the computing system is synchronized by a synchronization process with data from a remote synchronization replica on a remote computing system.

13. The computing system of claim 11, wherein the identifying information for the one or more first content items comprises at least one of: a cryptographic hash, a digital fingerprint, a size, and a last modified datetime of a content item.

14. The computing system of claim 11, wherein the identifying information generated from the one or more first content items comprises corresponding one or more first digital watermarks, and the instructions are further configured for:
generating identifying information from the one or more second content items by scanning the one or more second content items and extracting corresponding one or more second digital watermarks from the one or more second content items;
comparing the identifying information generated from the one or more second content items with identifying information generated from the one or more first content items by comparing the corresponding one or more second digital watermarks with the corresponding one or more first digital watermarks.

15. The computing system of claim 11, wherein the location, at which the computing system stores the one or more first content items, is within one or more locations at which synchronization replica is stored at the computing system, and the instructions are further configured for:
prior to receiving the indication to perform the one or more commands, receiving results of applying ownership identification criteria to a plurality of content items that are stored in a remote synchronization replica on a remote computing system
wherein the receiving is caused by a synchronization process in which metadata of the plurality of content items, which indicate ownership by the entity, is replicated from the remote synchronization replica to the synchronization replica of the computing system.

16. One or more non-transitory computer-readable storage media storing instructions, which when executed by one or more processors, cause:
receiving an indication to perform one or more commands in relation to one or more first content items, stored on a computing device, that, according to metadata stored at the computing device, are identified as owned by an entity;
storing one or more second content items at a different location on the computing device than a location at which the computing device stores the one or more first content items;
generating identifying information from the one or more first content items, stored on the computing device, that are identified as owned by the entity;
generating identifying information from the one or more second content items that are stored at the different location on the computing device than the location at which the computing device stores the one or more first content items;
comparing the identifying information generated from the one or more second content items with the identifying information generated from the one or more first content items;
based on the comparing the identifying information generated from the one or more second content items with the identifying information generated from the one or more first content items, creating and storing metadata at the computing device that identifies at least one content item, in the one or more second content items stored at the different location, as being owned by the entity;
wherein the metadata created and stored that identifies the at least one content item as being owned by the entity is distinct from the identifying information generated from the one or more first content items and the identifying information generated from the one or more second content items; and
in response to the indication to perform the one or more commands in relation to the one or more first content items, performing the one or more commands on at least the one or more first content items, and based on the metadata created and stored that identifies the at least one content item as being owned by the entity, performing the one or more commands on the at least one content item, in the one or more second content items stored at the different location, identified as owned by the entity.

17. The one or more non-transitory computer-readable storage media of claim 16, wherein:
the location, at which the computing device stores the one or more first content items, is within one or more locations at which synchronization replica is stored at the computing device and the different location is a location outside of the one or more locations at which the synchronization replica is stored at the computing device;
data from the synchronization replica on the computing device is synchronized by a synchronization process with data from a remote synchronization replica on a remote computing device.

18. The one or more non-transitory computer-readable storage media of claim 16, wherein the identifying information for the one or more first content items comprises at least one of: a cryptographic hash, a digital fingerprint, a size, and a last modified datetime of a content item.

19. The one or more non-transitory computer-readable storage media of claim 16, wherein the identifying information generated from the one or more first content items comprises corresponding one or more first digital watermarks, and wherein the instructions, when executed by the one or more processors, further cause:

generating identifying information from the one or more second content items by scanning the one or more second content items and extracting corresponding one or more second digital watermarks from the one or more second content items;

comparing the identifying information generated from the one or more second content items with identifying information generated from the one or more first content items by comparing the corresponding one or more second digital watermarks with the corresponding one or more first digital watermarks.

20. The one or more non-transitory computer-readable storage media of claim 16, wherein the location, at which the computing device stores the one or more first content items, is within one or more locations at which synchronization replica is stored at the computing device, and wherein the instructions, when executed by the one or more processors, further cause:

prior to receiving the indication to perform the one or more commands, receiving results of applying ownership identification criteria to a plurality of content items that are stored in a remote synchronization replica on a remote computing device wherein the receiving is caused by a synchronization process in which metadata of the plurality of content items, which indicate ownership by the entity, is replicated from the remote synchronization replica to the synchronization replica of the computing device.

* * * * *